United States Patent [19]

Verbrugge

[11] Patent Number: 4,924,809
[45] Date of Patent: May 15, 1990

[54] METHOD FOR CLEANING A TEAT OF A FEMALE ANIMAL, MILKING METHOD AND CUP FOR USE WITH ABOVE MENTIONED METHODS

[75] Inventor: Jeroen K. Verbrugge, Delft, Netherlands

[73] Assignee: Multinorm B.V., Netherlands

[21] Appl. No.: 141,194

[22] Filed: Jan. 6, 1988

[30] Foreign Application Priority Data

Feb. 2, 1987 [NL] Netherlands .................. 8700249

[51] Int. Cl.$^5$ .................................. A01J 5/16
[52] U.S. Cl. ................... 119/14.02; 119/14.47; 119/158
[58] Field of Search ............ 119/14.02, 14.18, 14.38, 119/14.47, 14.09, 14.27, 14.28, 14.48, 14.49, 14.50, 14.51, 14.52, 14.53, 158, 14.01, 159

[56] References Cited

U.S. PATENT DOCUMENTS

| | | | |
|---|---|---|---|
| 1,822,680 | 9/1931 | Taylor | 119/14.53 |
| 3,255,732 | 6/1966 | Raht | 119/14.52 |
| 4,200,058 | 4/1980 | Happel | 119/14.51 X |
| 4,305,346 | 12/1981 | Sparr, Sr. | 119/158 X |
| 4,403,569 | 9/1983 | Bennett | 119/14.18 |
| 4,771,007 | 9/1988 | Tippetts et al. | 119/14.01 X |

FOREIGN PATENT DOCUMENTS

| | | | |
|---|---|---|---|
| 3304536 | 8/1984 | Denmark | 119/14.02 |
| 2622794 | 12/1977 | Fed. Rep. of Germany | 119/159 |
| 938845 | 7/1982 | U.S.S.R. | 119/14.01 |
| 1210740 | 2/1986 | U.S.S.R. | 119/14.18 |

OTHER PUBLICATIONS

European Patent Application, "Implement for Milking Animals in a Stable", Inventer: Cornelis Van Der Lely, Publication No. 194,730, Netherlands.

*Primary Examiner*—Robert P. Swiatek
*Assistant Examiner*—Nicholas D. Lucchesi
*Attorney, Agent, or Firm*—Watson, Cole, Grindle & Watson

[57] ABSTRACT

This method of cleaning a teat of a female animal makes use of a cup provided with an opening for flushing washing and/or rinsing agent along the teat. Preferably, this method is included in automatic milking equipment.

6 Claims, 2 Drawing Sheets

METHOD FOR CLEANING A TEAT OF A FEMALE ANIMAL, MILKING METHOD AND CUP FOR USE WITH ABOVE MENTIONED METHODS

The present invention relates to a method for cleaning and/or rinsing a teat of a female animal.

The teats of a female animal have been cleaned up to the present time before and after milking of that female animal by a farmer by hand, for example with a wet cloth or a water jet, which may or may not be provided with a disinfecting agent or soap.

This known cleaning method has the disadvantage that the cleaning will either not be carried out often or not be done well.

The purpose of the invention is to provide a cleaning method for a teat of a female animal which ensures a meticulous wet cleaning of a teat of this female animal.

This object is achieved with the cleaning method as claimed in claim 1.

In preference the cleaning method as claimed in claim 2 is applied so that just as in the milking of a cow or goat a movement will be performed by a flexible wall on a teat of this cow or goat while a washing agent is applied, which will result in the washing agent combined with a simultaneous massaging movement making an optimal contact with the teat. Any dirt that may be adhering to the teat will come loose as a result.

In addition this invention provides a method for milking a female animal, whereby the cleaning method can be performed in a cup used for milking.

The invention further provides a cup for use with the cleaning method, as well as a milking set for four cups.

Further features, details and advantages of the current invention will become apparent with reference to a drawing, in which.

Figures 1, 4:
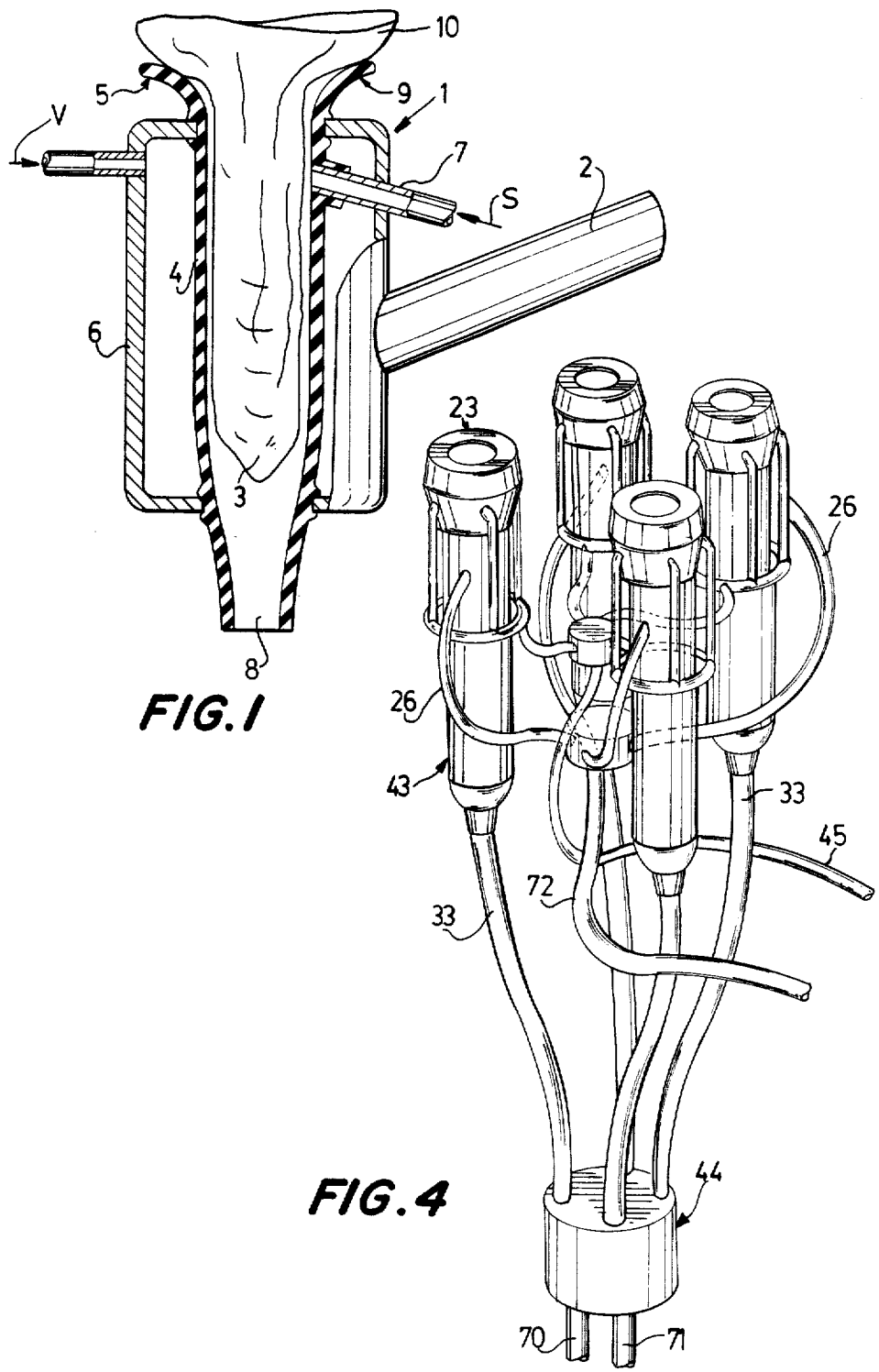
FIG. 1 shows partly in section a first embodiment of a cup for implementing a method according to the invention for cleaning a teat of a female animal.
FIG. 4 shows perspectively a milking set provided with four cups in accordance with the invention.

A cup 1 (FIG. 1) is placed on a handle 2 by a farmer under a teat 3 of a cow, of which cup 1 of a flexible wall 4 of an inner casing 5 is accommodated for instance in an outer casing 6, e.g. of metal. Supplied (arrow S) via a connection 7 to the upper part of teat 3 is a washing agent, for example water, which may or may not be provided with disinfectent agent or soap. In order to improve the washing action a pulsating pressure variation is preferably applied via arrow V over the wall of the inner casing 4, whereby the teat is massaged and the washing agent will make good contact with teat 3. The passage to an outlet 8 of the cup could if desired be pressed virtually shut beneath teat 3 so that a turbulent driving action is caused, which will improve cleaning still further. The washing agent will leave cup 1 via outlet 8. Underpressure is preferably connected to outlet 8 so that the washing agent will be drawn off easily and the teat 3 can be placed easily in cup 1. The upper piece 9 of inner casing 5 has a sealing action against the udder 10 of the cow.

Cleaning using cup 1 can take place both before and after milking. Prior to milking the washing will usually be done with water - rinsing -; only after milking will soap or disinfecting agent usually be added to the washing agent so that they will not get into the milk.

Figures 2, 3:
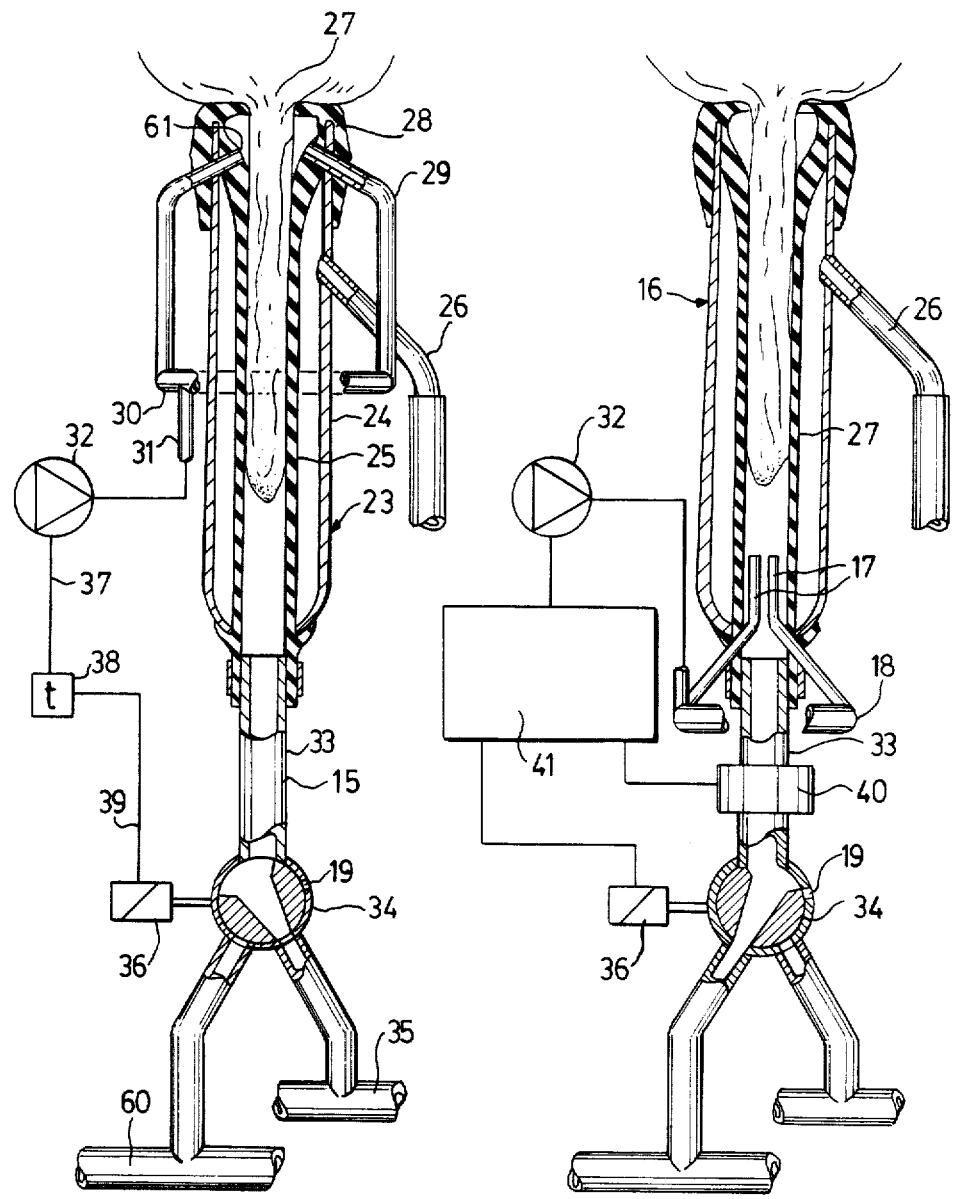
FIG. 2 shows schematically a second embodiment of a cup for implementing a method according to this invention.
FIG. 3 shows a third embodiment of a cup for implementing a method according to this invention.

In another embodiment of the method according to the invention (FIG. 2) a cup 23 for cleaning is likewise suitable for milking. Cup 23 is provided with an outer casing 24, e.g. of metal, and a inner casing 25 of flexible material, between which a milking movement for a teat 27 of a cow can be generated via conduit 26 by a milking machine (not shown). Cup 23 is provided with a cushion 28 for sealing against the udder and with lines 29 for supply of a washing agent, for instance water, extending into the openings 61 as well as through outer casing 23 and inner casing 25. Lines 29 are preferably situtated equidistantly around the periphery of cup 23 and ensure a good washing around the teat 27. It is of course possible to arrange only one line 29. Lines 29 are connected onto a ring line 30 around the outer casing, from which ring line another line 31 leads to a pump 32. The washing agent moves via a discharge 33, which is also suitable for the discharge of milk and which is held under underpressure, to a four-way valve 34 which in the situation drawn leads to line 35 for discharge of washing agent. Valve 34 can also be switched via control member 36 to a line 60 for discharge of milk. The four-way valve 34 can likewise place the cup in contact with the ambient pressure via bleed opening 19, which will result in cup 23 dropping off the teat. To impmrove liquid transport in the discharge lines a small orifice (diameter 0.1–0.5 mm) is arranged in line 33 for leakage of ambient air.

After switching off of pump 32 and at a moment in time t that is later than this switching off, control member 36 will switch the four-way valve 34 over to the position in which milk can be carried to the line 60 and the milk discharge can take place. Shown schematically is the link between pump 32 and control member 36 via lines 37, timing element 38 and line 39.

In another method according to the invention (FIG. 3) a milk quality meter 40 is applied which is arranged on the conduit 33 and which meausres the conductivity of milk or washing agent for discharge, as a result of which a regulating member 41 can determine into which position control member 36 must actuate the four-way valve 34. Teat 27 will thus be washed, whereby washing is performed optimally by pressure via conduit 26 and milking is simultaneously started up; it will take 5–15 secs. before milk will flow fully out of teat 27 after generating of a pulsating movement, this period of time usually being sufficient for complete cleaning of teat 27. The pulsating movement or pulse frequency during cleaning and milking are different so as to lose as little milk as possible during the washing phase. The regulating member 41 determines on the basis of the milk quality measured by the milk quality meter 40 at which precise moment the control member 36 must switch over the four-way valve 34. With the method as in FIG. 3 cleaning of the teat is carried out from beneath the teat using pump 32 via a ring line 18 and upward directed spray nozzles 17. It is herewith possible to use as cup 16 an upright milking cup provided on the underside with spray nozzles 17. With the method as in FIG. 1 and 2 the upper portion of the teat is better washed than with the method as in FIG. 3. There is furthermore less chance of dirt getting into the teat opening, the so-called teat-orifice. In the method and apparatus disclosed in FIGS. 1 and 2, the inlet opening for liquid cleaning agent is disposed adjacent the upper end of the inner casing for introducing cleansing agent into the inner casing and into initial contact with the upper portion of a teat disposed within the inner casing. The cleansing agent then flows downwardly over the teat from top to bottom thereof to clean off dirt and minimize the chance of dirt entering the teat orifice; and the cleansing agent is then removed through a discharge disposed adjacent the lower end of the casing.

In order to prevent any disinfectant agent or soap becoming mixed in with the milk it is recommended that a first washing of teat 27 prior to milking is carried out using only water as washing agent, while a washing performed subsequent to milking is carried out using soap or disinfecting agent in the washing agent.

If a teat of a cow is infected—mastitis—a milk quality meter (not shown) can be incorporated which in addition to measuring the difference between milk and washing also measures the difference between milk suitable for consumption and milk not suitable for that purpose (mastitis milk).

The milking set 43 (FIG. 4) is further provided with a central feed line 45 and a central connection 72 for supply of pulsating underpressure. The central member 44 is provided with a line 70 for discharge of milk suitable for consumption and a line 71 for discharge of milk not suitable for consumption and for washing agent discharge.

It is noted finally that the above described cleaning method as well as the milking method using this cleaning method are preferably employed in a automatically operating milking system, as described in the European patent application No. 86.201338.0, the European application No. 86.202380.1 and the Dutch patent application No. 86.02942 from the same applicant, the content of which must be considered as interpolated herein.

I claim:

1. The method of milking the udder of a female animal which comprises the steps of fitting a casing around a teat hanging from the udder and in sealing relationship thereto, supplying a liquid cleansing agent to the interior of the upper portion of said casing to cause the cleansing agent to initially contact the upper portion of an associated teat, continuing to supply the liquid cleansing agent for a time sufficient to properly clean the teat, applying a negative pressure to the interior of the casing at a discharge disposed at the lower portion of the casing to withdraw liquid cleansing agent at the discharge and causing the cleansing agent to flow downwardly over the teat from top to bottom thereof to clean off dirt and minnimize the chance of dirt entering the teat orifice, and then terminating the supply of liquid cleansing agent.

2. The method as defined in claim 1 including the step of applying pressure variations to said casing to deform the casing and massage the teat while the washing agent is in contact with the teat to provide optimal contact with the teat.

3. The method as defined in claim 2 wherein the cleansing agent is withdrawn through a first conduit, and including the further step of applying pressure variations to said casing to deform the casing to remove milk from the teat, and applying a negative pressure to the discharge at the lower portion of the casing for removing milk through a second conduit.

4. The method as defined in claim 3 including the steps of terminating the withdrawal of milk and then supplying a disinfecting agent to the interior of the upper portion of the casing to cause the disinfecting agent to initially contact the upper portion of an associated teat while applying a negative pressure to the discharge at the lower portion of the casing to withdraw the disinfecting agent at the discharge and causing the disinfecting agent to flow downwardly over the teat from top to bottom thereof.

5. A cup for milking and cleaning the teat of a female animal comprising an outer casing, an inner casing of flexible material having an upper and lower end and defining a space for receiving the teat of an animal, said inner casing being sealed with respect to said outer casing and defining a chamber therebetween, pressure means for supplying varying pressure to said chamber to cause massage of a teat disposed within said space, cleaning means for supplying a cleansing agent into said space for cleaninng a teat disposed within said space, said cleaning means including an inlet opening formed in said inner casing, a source of liquid cleansing agent connected with said inlet opening, said inlet opening being disposed adjacent the upper end of said inner casing for introducing cleansing agent into said inner casing and into initial contact with the upper portion of a teat received within said inner casing, and a discharge disposed adjacent the lower end of said inner casing for removing cleansing agent from said inner casing whereby cleansing agent flows downward over a teat received in said inner casing from top to bottom of the teat to minimize the chance of dirt entering the teat orifice.

6. A cup as defined in claim 5 wherein said inner casing including a discharge line for cleansing agent, a discharge line for milk, and valve means for selectively connecting said discharge with one or the other of said discharge lines.

* * * * *